(12) United States Patent
Takeuchi

(10) Patent No.: US 6,217,063 B1
(45) Date of Patent: Apr. 17, 2001

(54) INFLATABLE BELT

(75) Inventor: Hiroyuki Takeuchi, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/328,363

(22) Filed: Jun. 9, 1999

(30) Foreign Application Priority Data

Jun. 9, 1998 (JP) .................................. 10-160780

(51) Int. Cl.$^7$ .................................. B60R 21/18
(52) U.S. Cl. .................................. 280/733
(58) Field of Search .................................. 280/733

(56) References Cited

U.S. PATENT DOCUMENTS

| 5,466,002 | 11/1995 | Tanaka et al. | ............... 280/733 |
| 5,466,003 | * 11/1995 | Tanaka et al. | ............... 280/733 |

FOREIGN PATENT DOCUMENTS

| 0 041 368 | 12/1981 | (EP) . |
| 2 694 529 | 2/1994 | (FR) . |
| 5-85301 | 4/1993 | (JP) . |
| 97/23367 | 7/1997 | (WO) . |

* cited by examiner

Primary Examiner—Kenneth R. Rice
(74) Attorney, Agent, or Firm—Foley & Lardner

(57) ABSTRACT

An inflatable belt has an envelope-shaped or elongated belt body, which is folded in a long band-like configuration, and a cover enclosing the belt body. One end of the belt body 11 is connected to a tongue 15. The cover preferably is made from a stretchable knitted fabric. There is a cushion layer between the belt body 11 and the cover 12. The outer surface of the cushion layer 13 is processed by low frictional treatment such as fluororesin coating. A low-friction film or tape may also be laid between the cushion layer and the cover. Thus, the inflatable belt feels softer when it contacts the occupant or when the occupant touches the belt.

20 Claims, 6 Drawing Sheets

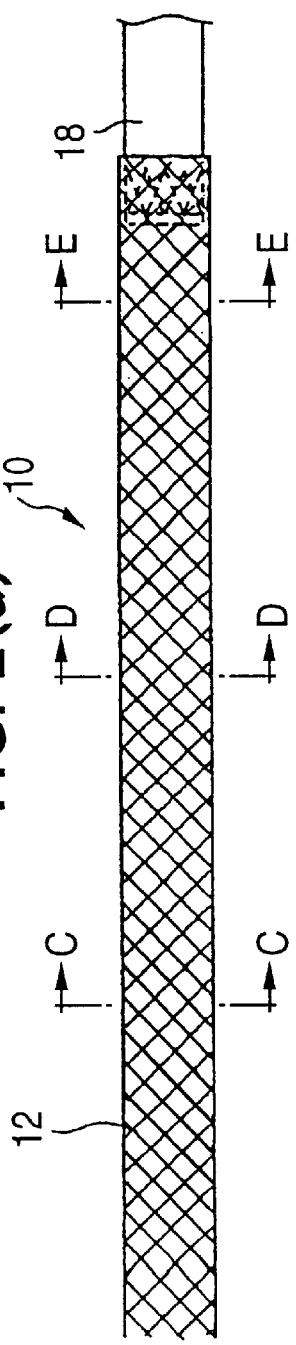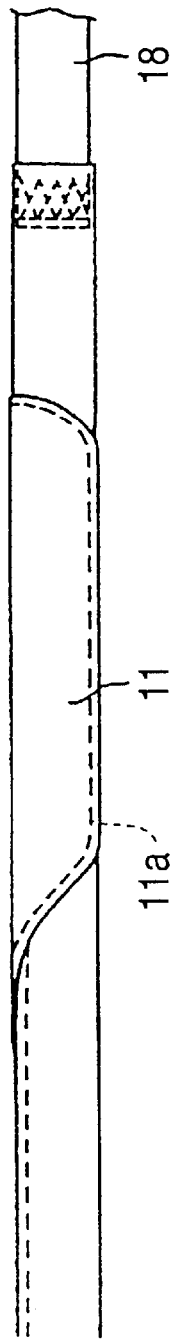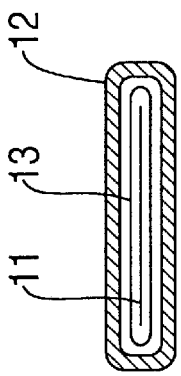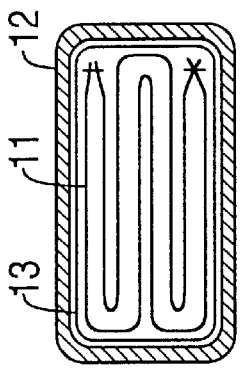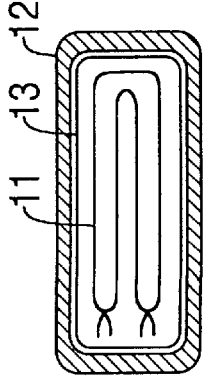

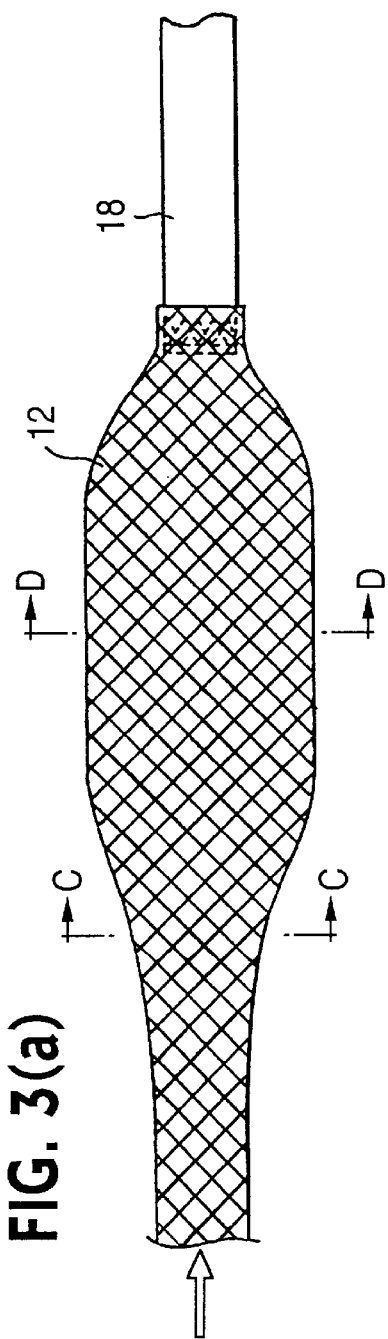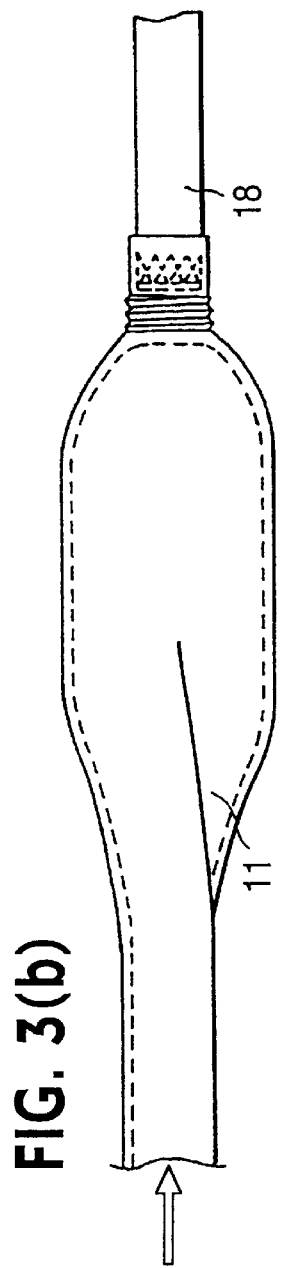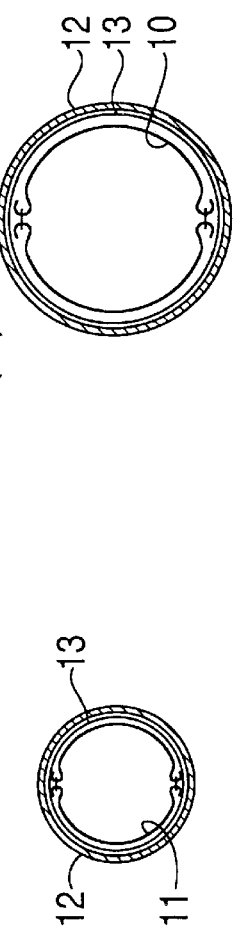
FIG. 3(a)  FIG. 3(b)  FIG. 3(c)  FIG. 3(d)

INFLATABLE BELT

BACKGROUND OF THE INVENTION

1. Field of the Invention

The present invention relates to a seat belt for protecting a vehicle occupant during a vehicle collision and, more particularly, to an inflatable belt which is capable of being inflated with gas.

2. Description of the Related Art

An inflatable belt device of this type is disclosed in Japanese Unexamined Patent Publication H05-85301 and is shown in FIGS. 6(*a*) and 6(*b*). This passenger protective device 1 includes a shoulder belt 2 extending diagonally from the right side to the left side of a passenger, a lap belt 3 extending from the right side to the left side of the passenger, a buckle 4 fixed to, for example, a vehicle floor, a tongue 5 to be inserted into and engaged with the buckle 4 when the passenger wears the belt, and an intermediate guide 6 for guiding the shoulder belt 2.

The shoulder belt 2 includes a normal webbing 2*a*, which is the same as a typical conventional seat belt, and an inflatable belt 2*b* connected to an end of the webbing 2*a*. The webbing 2*a* is slidably hung in the intermediate guide 6. The other end of the webbing 2*a* is connected to a shoulder belt retractor 7 with an emergency locking mechanism (ELR), which is fixed to the vehicle body. The webbing 2*a* is arranged such that it is wound into the shoulder belt retractor 7.

The inflatable belt 2*b* is positioned so that it contacts the passenger and is connected to the tongue 5 at an end opposite to the end connected to the webbing 2*a*. The lap belt 3 is composed of a normal webbing, which is the same as a typical conventional seat belt, having one end connected to the tongue 5 and the other end connected to a lap belt retractor 8 (ELR), which is fixed to the vehicle body. A gas generator 9 is connected to the buckle 4. The gas generator 9 is actuated in emergency situations, e.g., vehicle collisions, to generate high-pressure gas. The tongue 5 and the buckle 4 are each provided with passages for introducing gas from the gas generator 9 into the inflatable belt 2*b*.

The inflatable belt 2*b* of the shoulder belt 2 includes a belt body 2*c* formed in an envelope-like shape and a cover 2*d*. The belt body 2*c* is folded, shown in solid lines in FIG. 6(*b*), and then covered by the cover 2*d*. The ends of the cover 2*d* are then connected to each other by stitching 2*e* so that the inflatable belt 2*b* is maintained in a band-like configuration. The stitching 2*e* of the cover 2*d* is easily torn by the force of the shoulder belt 2 expanding when the gas generator 9 is actuated so that the inflatable belt 2*b* is deployed, shown by a two-dot chain line in FIG. 6(*b*).

The belt body 2*c* is made of, for example, rubber coated fabric and the cover 2*d* is made of a flexible knit with excellent stretchability.

The conventional inflatable belt feels very stiff when touched by a vehicle occupant.

SUMMARY OF THE INVENTION

Accordingly, it is an object of the invention to provide an inflatable belt having an improved feeling when it is touched by a vehicle occupant.

A preferred embodiment of the includes a belt body into which a gas is introduced; a cover enclosing the belt body; and a cushion layer between the cover and the belt body.

Additional objects and advantages of the invention will be set forth in the following description of the preferred embodiments and, in part, will be obvious from the description or through practicing the invention. The objects and advantages may be realized through the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and, together with the above general description and the following detailed description, serve to explain the principles of the invention.

FIG. 1(*b*) is a perspective view, partly in section, of that same embodiment.

FIG. 2(*a*) is a plan view of a portion around the connection between a shoulder belt and an inflatable belt;

FIG. 2(*b*) is a plan view of an envelope-shaped belt body;

FIGS. 2(*c*), 2(*d*), and 2(*e*) are sectional views taken along lines C—C, D—D, and E—E of FIG. 2(*a*), respectively.

FIG. 3(*a*) is a plan view of a shoulder belt in a state where the inflatable belt is inflated;

FIG. 3(*b*) is a plan view of the belt body in the inflated state; and

FIGS. 3(*c*) and 3(*d*) are sectional views taken along lines C—C and D—D in FIG. 3(*a*), respectively.

DETAILED DESCRIPTION OF THE PREFERRED EMBODIMENTS

Figure 1A:
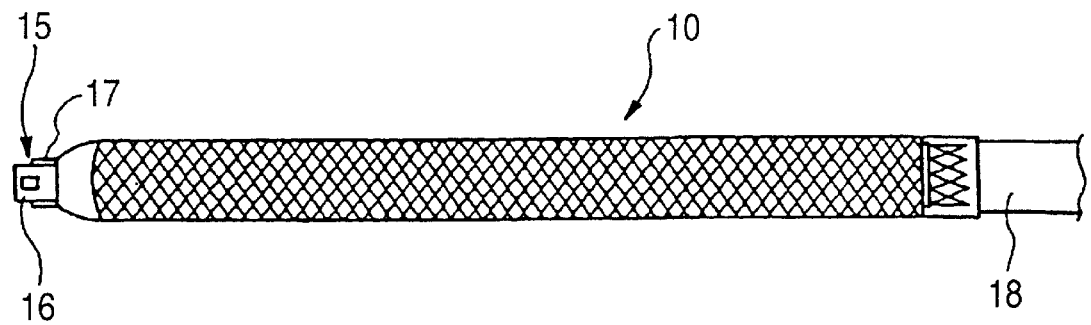
FIG. 1(*a*) is a general view of one embodiment of the invention.
Figure 1B:
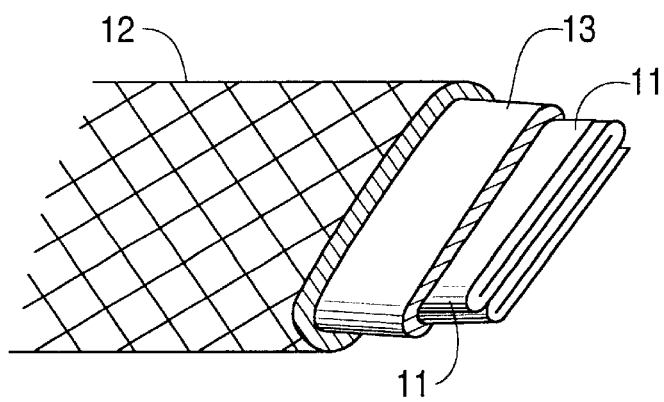

Referring now to the Figures and initially to FIGS. 1(*a*) and 1(*b*), there will be seen an inflatable belt 10 according to one embodiment of the invention. The inflatable belt 10 includes an envelope-shaped or elongated belt body 11 folded in a long band-like configuration, a cover 12, which is preferably a knit cover, enclosing the belt body 11, and a cushion layer 13 between the belt body 11 and the cover 12.

The cushion layer 13, preferably, is made from a soft material such as, for example, polyurethane or PVC. The thickness of the cushion layer 13 is preferably from 0.5 mm to 5 mm, particularly from 1 mm to 3 mm. The outer surface of the cushion layer 13, which contacts the cover 12, is processed by low frictional treatment. Examples of low frictional treatment include fluororesin coating, PVC dip coating, and the like.

As shown in FIG. 1(*a*), one end of the belt body 11 is connected to a tongue 15, which includes a tongue plate 16 and a cylindrical socket 17 for introducing gas into the inflatable belt 10.

Figure 6A:
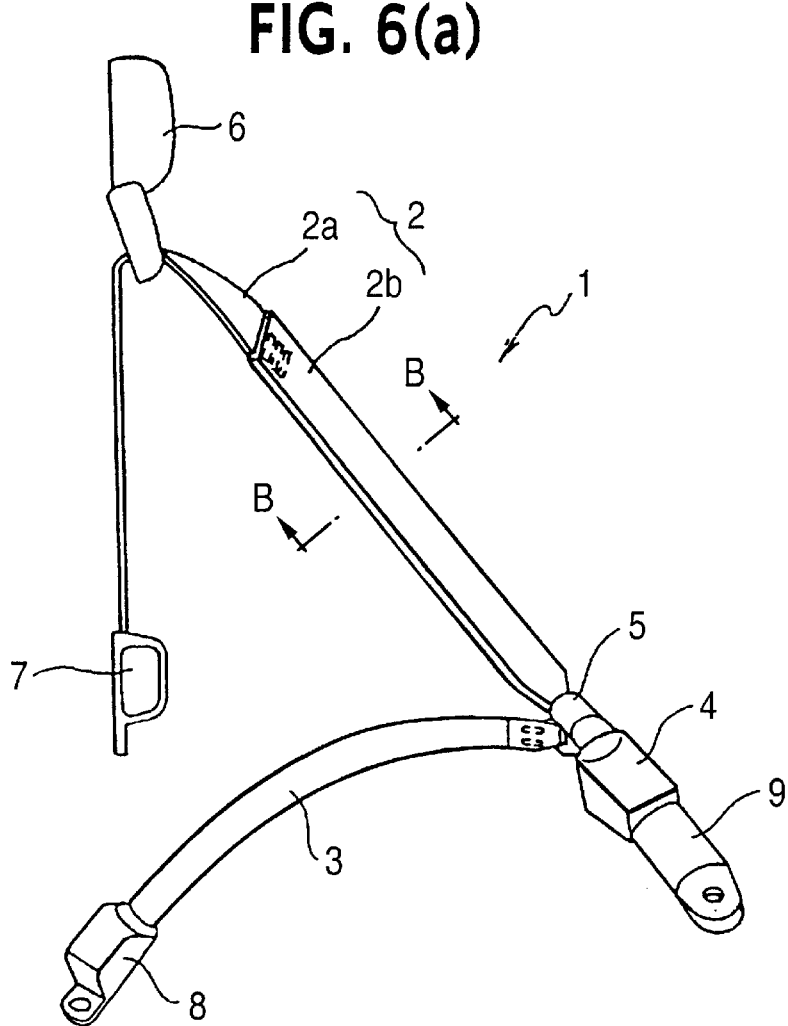
FIGS. 6(*a*) and 6(*b*) are views illustrating the structure of a conventional inflatable belt.
Figure 6B:
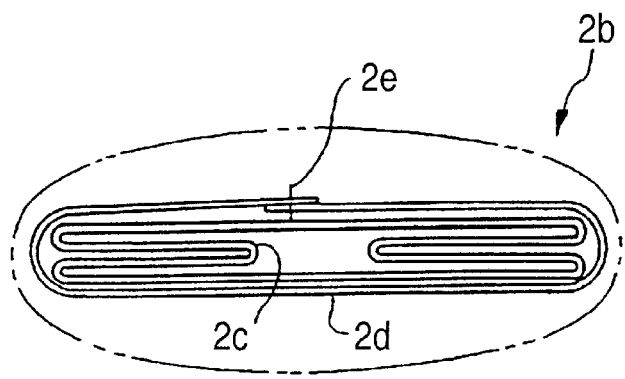

Similar to the conventional seat belt system of FIGS. 6(*a*) and 6(*b*), the tongue plate 16 is inserted into a tongue insertion slot of a buckle and is latched by a latching mechanism. The latching is canceled by pressing a press button on the buckle. The socket 17 is fitted to a plug of the buckle so that gas from a gas generator or inflator is introduced into the belt body 11 through the plug and the socket 17.

The inflatable belt 10 is a part of a shoulder belt and the other end of the belt body 11 is connected, preferably via sewing or the like, to an end of a webbing 18. The other end of the webbing 18 is fixed to a take-up shaft or reel shaft of a retractor for the shoulder belt. An end of a lap belt is secured to the tongue 15 and the other end is fixed to a take-up shaft of a retractor for the lap belt.

The belt body 11 is shaped such that parts corresponding to the chest and abdomen of an occupant are wider than the other parts of the inflatable belt. As shown in FIG. 2(a), the inflatable belt 10 has a long band-like configuration and has a cover 12. As shown in FIG. 2(b), the wider part is folded to make the belt body 11 in the long band-like configuration. The belt body 11 is made from a fabric that is preferably coated with a soft rubber such as silicone rubber. The fabric is then sewn to form the belt body 11 (the sewing results in a seam 11a). As shown in FIGS. 2(c)–2(e), the belt body may be folded in a number of different manners.

Figure 5:
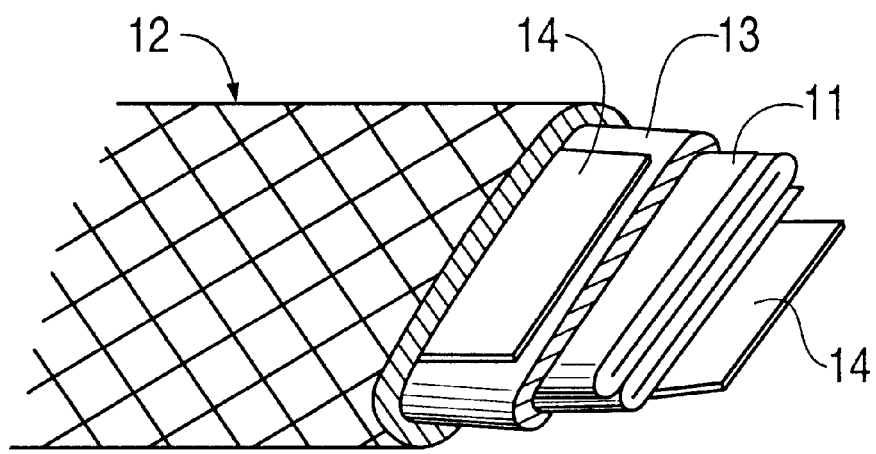
FIG. 5 is a perspective sectional view of another embodiment of the inflatable belt according to the invention.

A second embodiment of an inflatable belt 10A is shown in FIG. 5. The inflatable belt 10A includes tapes 14 that are preferably made from a material having a low friction coefficient and that are placed between the outer surface of the cushion layer 13 and the inner surface of the cover 12. Examples of the tapes include fluororesin tapes and the like.

Though the tapes 14 intervene in FIG. 5, the cushion layer 13 may be entirely coated with a film of a low frictional material such as fluororesin. In this case, it is preferable that the coating film be provided with a tear line, e.g., a perforation or a slit, so that the film tears along the tear line when the belt body 11 is inflated.

Figure 4A:
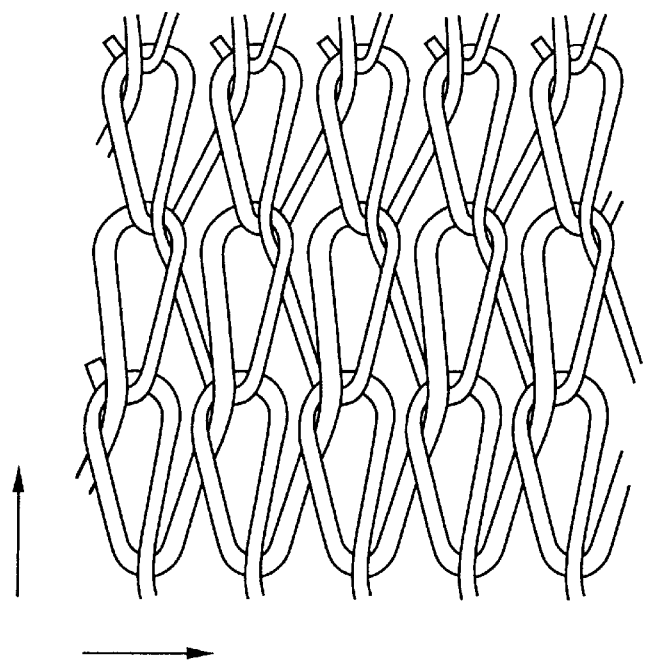
FIGS. 4(*a*) and 4(*b*) are views for explaining the knit structure of a cover of the inflatable belt.
Figure 4B:
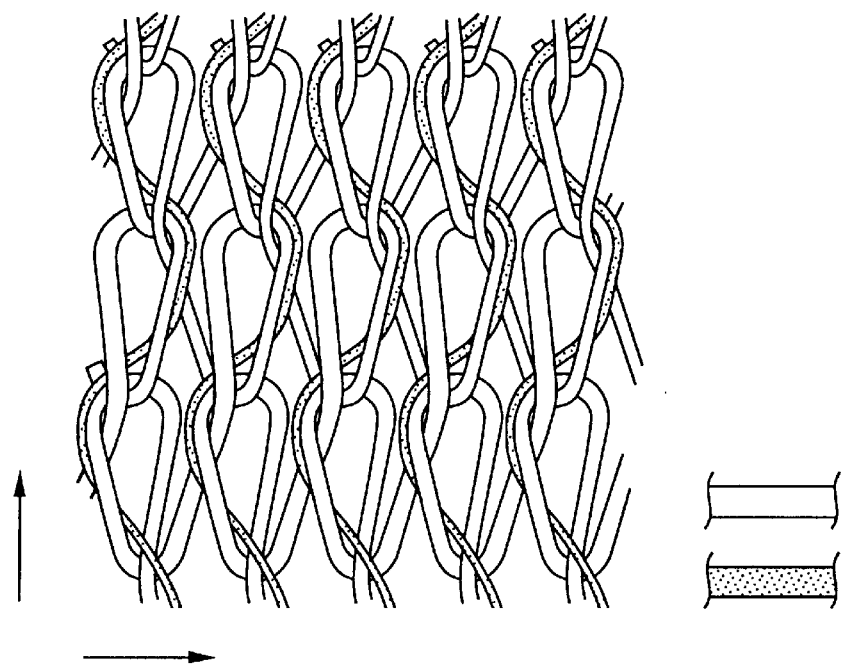

The cover 12 is supplely stretchable in its width direction, but is hard to stretch in the longitudinal direction of the belt. FIGS. 4(a) and 4(b) are two examples of methods for knitting the preferable knit cover. FIG. 4(a) shows normal warp-knitted stitches and FIG. 4(b) shows stitches that are warp-knitted, but have additional yarns inserted to increase the strength the strength of the cover fabric while maintaining its thinness. The cover 12 is hard to stretch in the longitudinal direction (withdrawing direction) of the belt because it is preferably processed by heating and drawing.

The cover 12, preferably, is cylindrically shaped and has one end, together with the belt body 11, connected to the tongue 15, while the other end, together with the belt body 11, is connected to the webbing 18, by sewing or the like. The cover 12 is connected to both the webbing 18 and the tongue 15 so as to withstand a tension load that is applied to the inflatable belt.

As shown in FIGS. 3(a)–3(d), the knit cover 12 is hard to stretch in the longitudinal direction of the belt because it is processed by heating and drawing. The interstices of the knit cover 12 stretch in the width direction when the belt body 11 is inflated. As a result, the knit cover 12 shrinks in the longitudinal direction so that the length of the inflatable belt 10 or 10A is shortened.

The inflatable belt 10, 10A structured as mentioned above will be used for protecting an occupant in the same manner as a normal seat belt when the tongue 15 is engaged with the buckle. The inflatable belt 10, 10A has a cushion layer 13 between the cover 12 and the belt body 11, thereby feeling softer to the occupant. The friction between the cushion layer 13 and the cover 12 should be small enough such that the inflatable belt 10, 10A may bend in a supple fashion. This bending allows the inflatable belt 10, 10A to fit the body contours of the occupant very easily.

When the gas generator is actuated due to a vehicle collision or roll-over, gas is introduced into the belt body 11 so that the belt body 11 is inflated. When the inflatable body 11 is inflated, the cushion layer 13 and the cover 12 are also inflated.

Alternatively, the cushion layer 13 may be provided with a tear line comprising a perforation or a slit so that the cushion layer 13 tears along the tear line when the belt body 11 is inflated.

As described in the above, the inflatable belt of the present invention has an improved feeling when touched by the occupant, thereby providing improved comfort to the occupant. Further according to the present invention, the friction between the cushion layer and the cover can be reduced, thereby facilitating the bending of the inflatable belt.

An inflatable belt of the present invention protects an occupant in a vehicle seat and is inflated when a gas is introduced inside. The inflatable belt includes an envelope-shaped or elongated belt body into which gas is introduced, a stretchable cover enclosing the belt body, and a cushion layer between the cover and the belt body.

The inflatable belt according to the invention, because of the cushion layer laid between the belt body and the cover, feels soft when it contacts the occupant or when the occupant touches the belt.

In the present invention, it is preferable that the frictional resistance between the cushion layer and the cover be reduced so that bending of the inflatable belt is facilitated. To reduce the frictional resistance between the cushion layer and the cover, the surface of the cushion layer is preferably processed by a low frictional treatment. A low-friction film or tape may also be laid between the cushion layer and the cover.

Additional modifications and advantages may readily appear to one skilled in the art. The invention, therefore, is not limited in to the specific details set forth herein. Accordingly, various modifications may be made without departing from the spirit or scope of the invention as defined by the appended claims and their equivalents.

This application is one of seven copending applications:

| U.S. Ser. No. | U.S. Filing Date | Our Docket No. | Japanese Application No. |
| --- | --- | --- | --- |
| 09/327,481 PENDING | June 8, 1999 | 086142/0246 | H10-159293 |
| 09/327,451 ABANDONED | June 8, 1999 | 086142/0247 | H10-159296 |
| 09/327,547 U.S. PATENT 6,135,563 | June 8, 1999 | 086142/0248 | H10-159295 |
| 09/327,546 PENDING | June 8, 1999 | 086142/0249 | H10-159297 |
| 09/327,289 PENDING | June 9, 1999 | 086142/0250 | H10-160777 |
| 09/327,890 PENDING | June 9, 1999 | 086142/0253 | H10-160778 and H10-160779 |

The instant application hereby incorporates by reference the entire specification including claims and abstract and the drawings of each of the other six applications.

What is claimed is:

1. An inflatable belt for protecting an occupant in a vehicle seat, the inflatable belt comprising:
   a belt body into which a gas is introduced;
   a cover enclosing the belt body; and
   a cushion layer between the cover and the belt; and
   a film between the cushion layer and the cover.

2. An inflatable belt as claimed in claim 1, wherein the film has a low coefficient of friction.

3. An inflatable belt as claimed in claim 1, further comprising a tape between said cushion layer and said cover.

4. An inflatable belt as claimed in claim 3, wherein the tape has a low coefficient of friction.

5. An inflatable belt as claimed in claim 1, wherein the cover includes a knit fabric.

6. An inflatable belt as claimed in claim 1, wherein a thickness of the cushion layer is between 0.5 mm and 5 mm.

7. An inflatable belt as claimed in claim 1, wherein a thickness of the cushion layer is between 1 mm and 3 mm.

8. An inflatable belt as claimed in claim 1, wherein the belt body is coated with a soft rubber.

9. An inflatable belt as claimed in claim 1, wherein the belt body is coated with a silicone rubber.

10. An inflatable belt as claimed in claim 1, wherein the cover is hard to stretch in a longitudinal direction.

11. An inflatable belt for protecting an occupant in a vehicle seat, the inflatable belt comprising:

a belt body into which a gas is introduced;

a cover enclosing the belt body; and a cushion layer between the cover and the belt body; and wherein an outer surface of the cushion layer has a low coefficient of friction.

12. An inflatable belt as claimed in claim 11, wherein an outer surface of the cushion layer is coated with a fluororesin coating.

13. An inflatable belt as claimed in claim 12, wherein the fluororesin coating includes a tear line.

14. An inflatable belt as claimed in claim 11, wherein the outer surface of the cushion layer is coated with a PVC dip coating.

15. An inflatable belt as claimed in claim 14, wherein the PVC dip coating includes a tear line.

16. An inflatable belt as claimed in claim 11, wherein the cover includes a knit fabric.

17. An inflatable belt as claimed in claim 11, wherein a thickness of the cushion layer is between 0.5 mm and 5 mm.

18. A safety belt system comprising:

a webbing;

an inflatable belt connected at one end to the webbing, the inflatable belt including a belt body into which a gas is introduced; a cover enclosing the belt body; and a cushion layer between the cover and the belt body;

a tongue having a duct communicating with the gas inlet of the inflatable belt; and a gas generator communicating with the duct of the tongue for supplying a gas into the inflatable belt to inflate the inflatable belt; and wherein an outer surface of the cushion layer has a low coefficient of friction.

19. An inflatable belt for protecting an occupant in a vehicle seat, the inflatable belt comprising:

a belt body into which a gas is introduced;

a cover enclosing the belt body; and a cushion layer between the cover and the belt body; and a tape between said cushion layer and said cover.

20. An inflatable belt as claimed in claim 19, wherein the tape has a low coefficient of friction.

* * * * *